US010334160B2

(12) United States Patent
Yamamoto

(10) Patent No.: US 10,334,160 B2
(45) Date of Patent: Jun. 25, 2019

(54) IMAGING APPARATUS CAPABLE OF AUTOMATIC PHOTOGRAPHY, IMAGE PLAYBACK APPARATUS WHICH PLAYS BACK AUTOMATICALLY PHOTOGRAPHED IMAGE, IMAGE PLAYBACK METHOD, AND IMAGING METHOD

(71) Applicant: CASIO COMPUTER CO., LTD., Shibuya-ku, Tokyo (JP)

(72) Inventor: Futoshi Yamamoto, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/703,643

(22) Filed: Sep. 13, 2017

(65) Prior Publication Data
US 2018/0091731 A1 Mar. 29, 2018

(30) Foreign Application Priority Data

Sep. 28, 2016 (JP) .................................. 2016-189524
Sep. 4, 2017 (JP) .................................. 2017-169567

(51) Int. Cl.
*H04N 5/232* (2006.01)
*H04N 5/77* (2006.01)
(Continued)

(52) U.S. Cl.
CPC ........... *H04N 5/23222* (2013.01); *H04N 5/77* (2013.01); *H04N 5/907* (2013.01); *H04N 9/8205* (2013.01);
(Continued)

(58) Field of Classification Search
CPC .. H04N 5/23222; H04N 9/8205; H04N 5/907; H04N 5/77; H04N 5/23296;
(Continued)

(56) References Cited

U.S. PATENT DOCUMENTS

| 8,285,424 | B2* | 10/2012 | Nakajima | B60W 50/045 348/148 |
| 8,466,987 | B2* | 6/2013 | Walker | G11B 27/034 348/231.7 |
| 9,871,994 | B1* | 1/2018 | Vaden | H04N 5/9206 |

FOREIGN PATENT DOCUMENTS

| JP | 2004361708 A | 12/2004 |
| JP | 2009188899 A | 8/2009 |

(Continued)

OTHER PUBLICATIONS

Japanese Office Action dated Apr. 10, 2018 issued in counterpart Japanese Application No. 2017-169567.
(Continued)

*Primary Examiner* — Yogesh K Aggarwal
(74) *Attorney, Agent, or Firm* — Holtz, Holtz & Volek PC

(57) ABSTRACT

According to an embodiment, image playback apparatus includes: an image acquisition device configured to acquire, in association with a plurality of sensing functions capable of being activated or inactivated, photography image information automatically photographed under a predetermined photography condition, based on a sensing result of the activated sensing function, the image acquisition device being configured to acquire the photography image information together with trigger information indicative of the photography condition or the sensing function used under the photography condition; and a display device configured to display an image.

11 Claims, 10 Drawing Sheets

(51) Int. Cl.
    *H04N 5/907*     (2006.01)
    *H04N 9/82*     (2006.01)

(52) U.S. Cl.
    CPC ..... *H04N 5/23219* (2013.01); *H04N 5/23296* (2013.01)

(58) Field of Classification Search
    CPC ........... H04N 5/23219; H04N 5/23299; H04N 5/23293; H04N 5/232935; G02B 7/36; G02B 7/38
    USPC ........................................ 348/231.99, 231.7
    See application file for complete search history.

(56) References Cited

FOREIGN PATENT DOCUMENTS

| | | |
|---|---|---|
| JP | 2010158047 A | 7/2010 |
| JP | 2010259028 A | 11/2010 |
| JP | 2012156822 A | 8/2012 |
| JP | 2013117998 A | 6/2013 |
| JP | 2016082842 A | 5/2016 |
| JP | 2016119624 A | 6/2016 |

OTHER PUBLICATIONS

Japanese Office Action dated Jan. 23, 2018 issued in counterpart Japanese application No. 2017-169567.

* cited by examiner

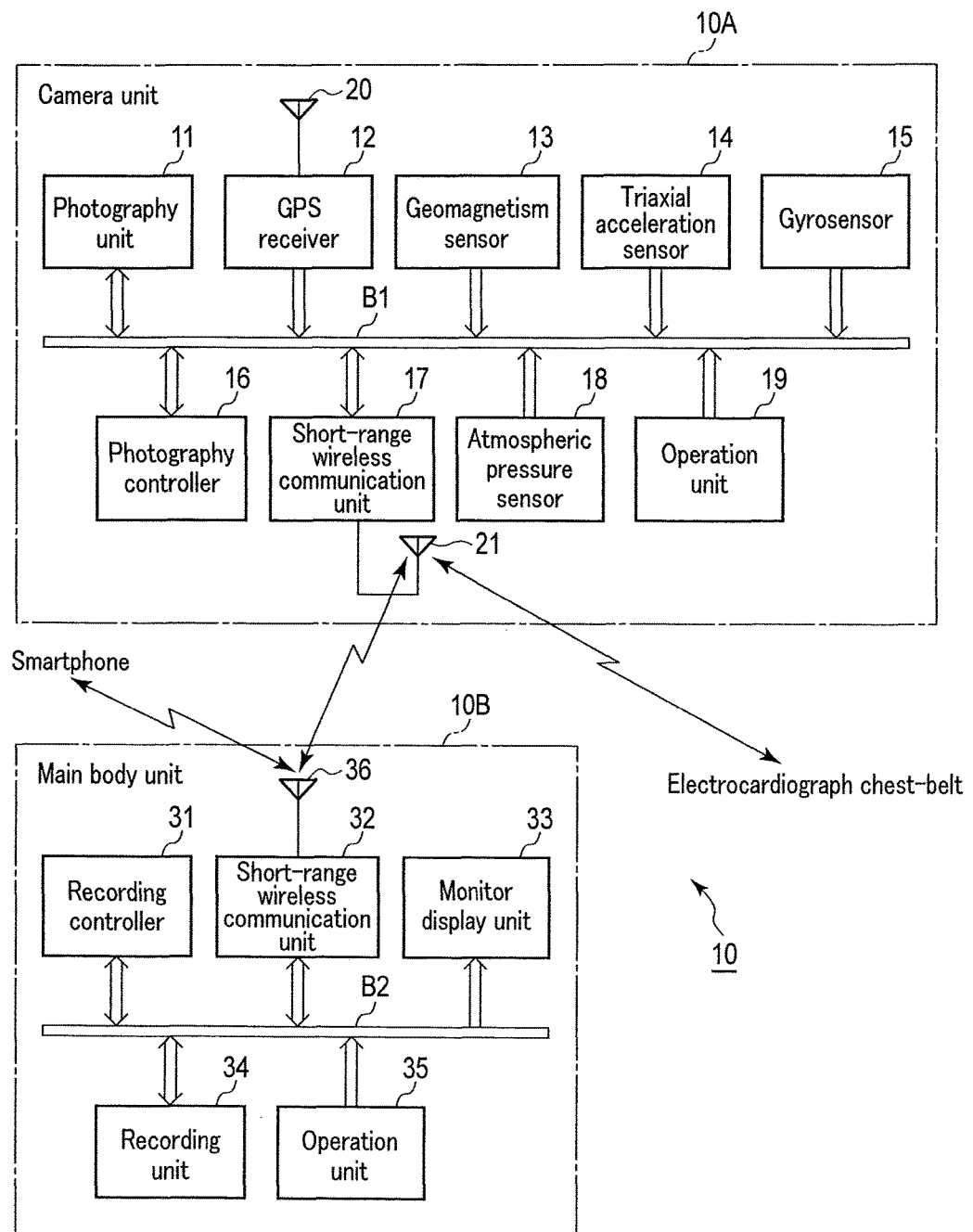
F I G. 1

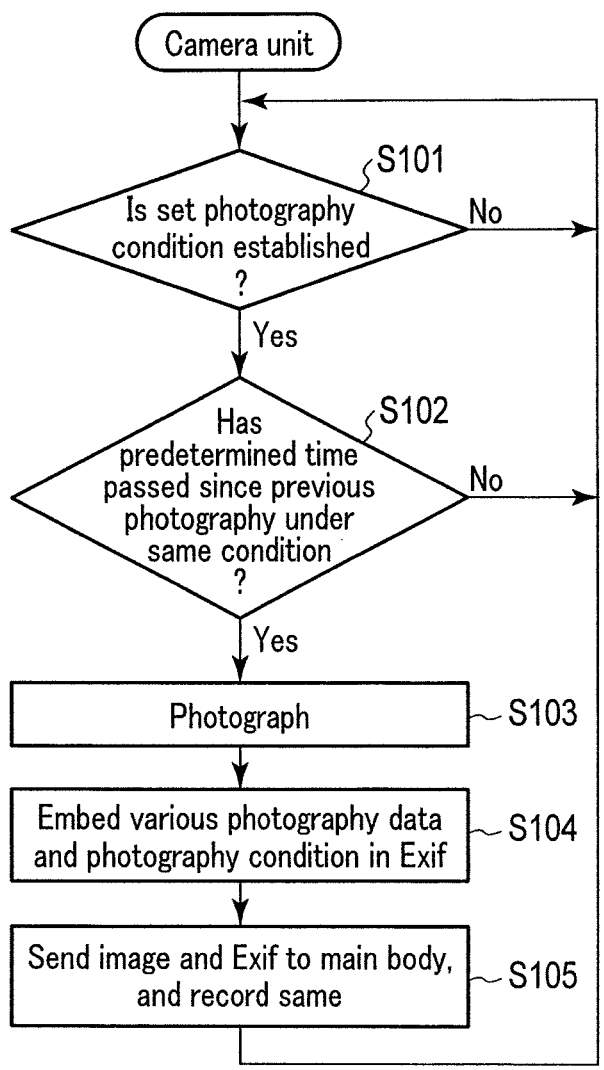
F I G. 4

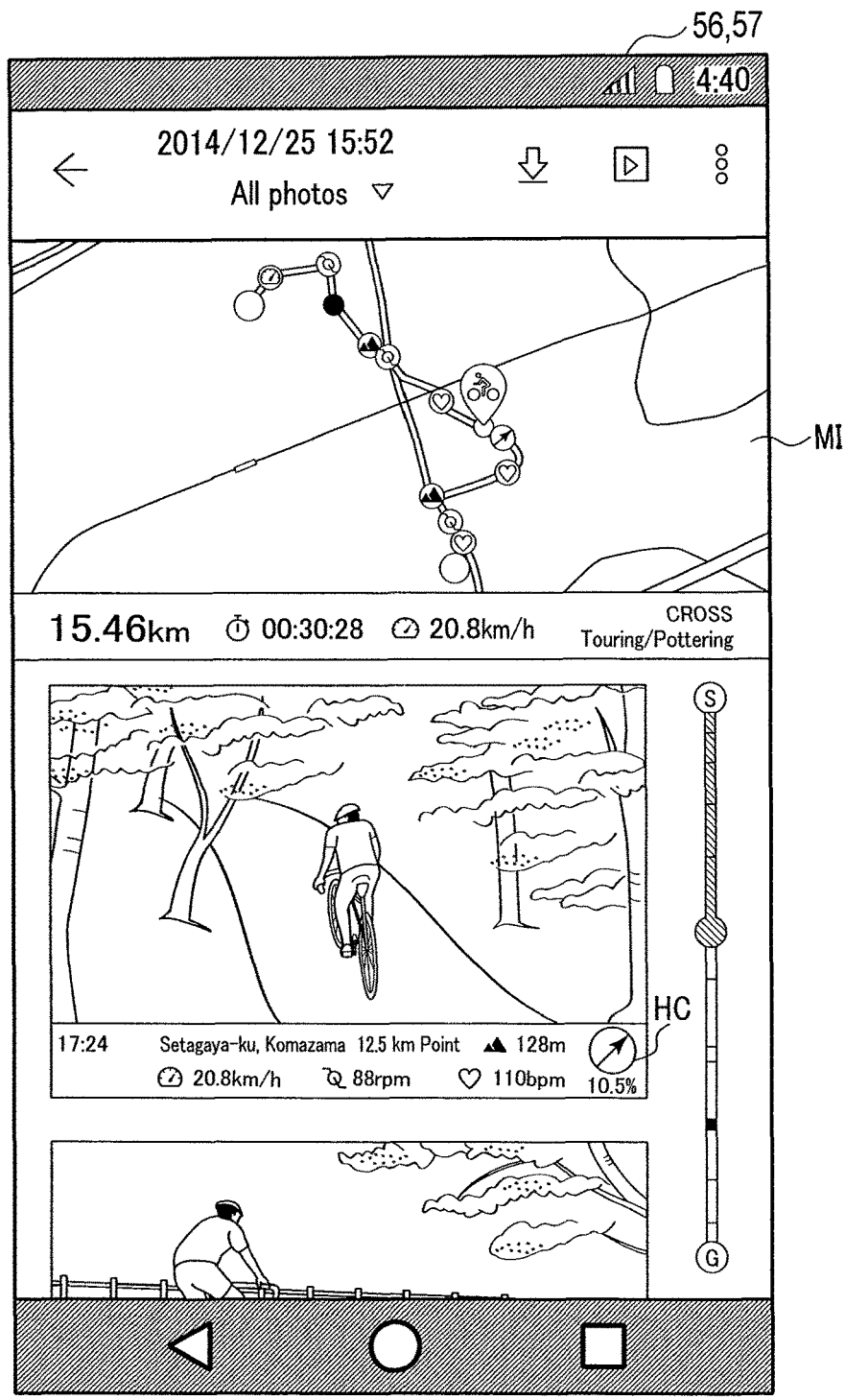
F I G. 7

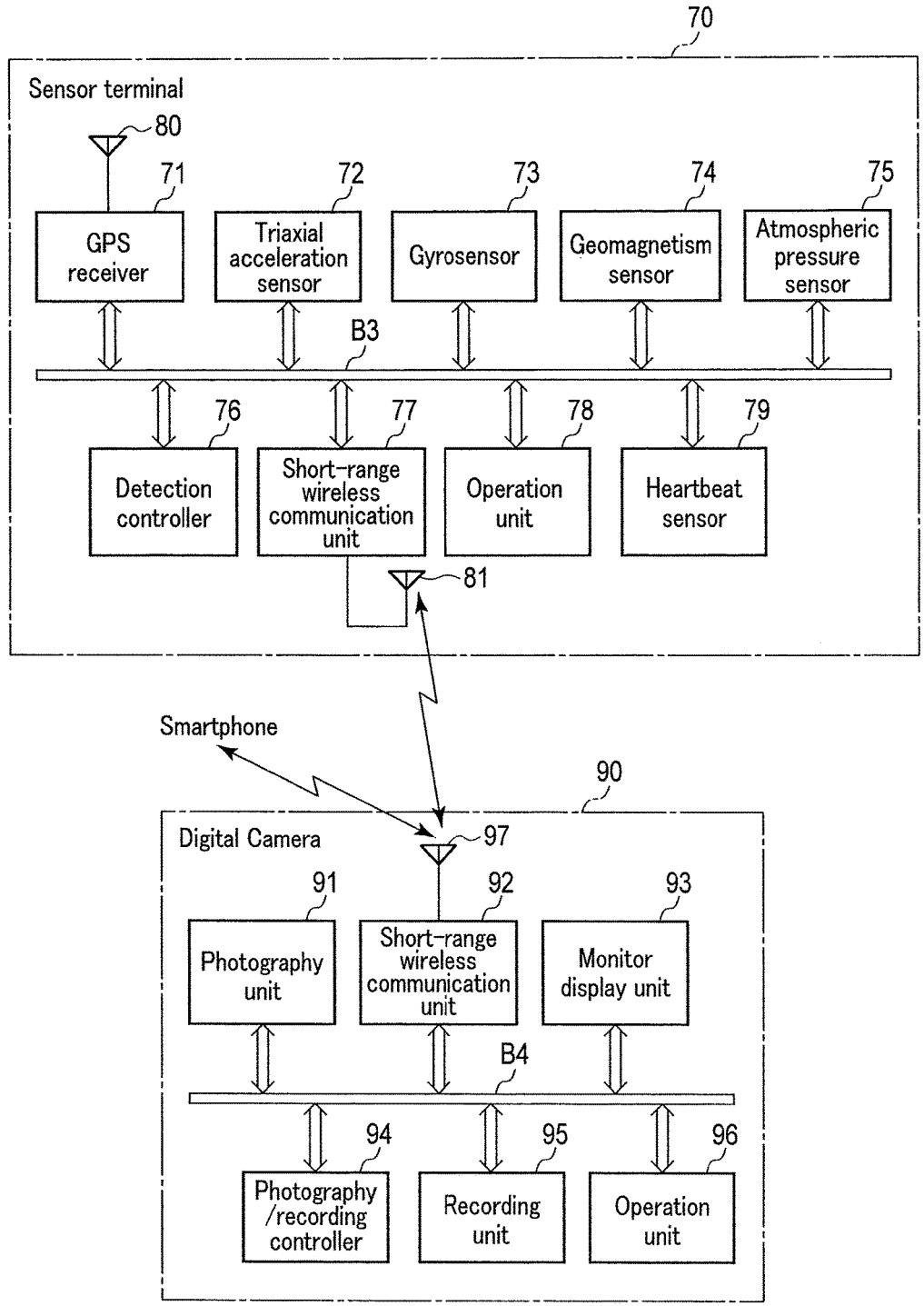
F I G. 8

IMAGING APPARATUS CAPABLE OF AUTOMATIC PHOTOGRAPHY, IMAGE PLAYBACK APPARATUS WHICH PLAYS BACK AUTOMATICALLY PHOTOGRAPHED IMAGE, IMAGE PLAYBACK METHOD, AND IMAGING METHOD

CROSS-REFERENCE TO RELATED APPLICATIONS

This application is based upon and claims the benefit of priority from Japanese Patent Applications No. 2016-189524, filed Sep. 28, 2016; and No. 2017-169567, filed Sep. 4, 2017, the entire contents of all of which are incorporated herein by reference.

BACKGROUND OF THE INVENTION

1. Field of the Invention

The present invention relates to a technique which is suited to, in particular, a case of playing back and displaying an image which is automatically photographed by a function which a camera includes.

2. Description of the Related Art

In recent years, with the advent of a wearable camera in which a plurality of sensors are mounted, there is known a technique of performing automatic photography in accordance with a measurement result of the sensors.

As a technique on a photographing side, for example, patent document 1 (Jpn. Pat. Appln. KOKAI Publication No. 2016-119624) proposes the following technique. Physical amounts, such as an acceleration, various kinds of speeds and an atmospheric pressure, which relate to a driver of a bicycle, are measured in order to properly photograph scenes during the driving by the bicycle. Based on the measured physical amounts, an evaluation relating to the state of the driver is performed. In accordance with the result of the evaluation, automatic photography is controlled.

In addition, as disclosed in patent document 2 (Jpn. Pat. Appln. KOKAI Publication No. 2010-158047), there is proposed a technique in which a condition for automatic photography is arbitrarily selected, and automatic photography is executed when it is judged that the selected condition of automatic photography is satisfied.

Besides, as a technique on a playback side, patent document 3 (Jpn. Pat. Appln. KOKAI Publication No. 2010-259028) proposes the following technique. A plurality of frames of images, which were automatically photographed by a drive recorder, are arranged in a window, and events at which photography was executed are displayed in association with the frame images. The events at which photography was executed indicate that images were photographed, for example, at such times as when a value of an acceleration sensor exceeded a predetermined threshold, when an instruction was received from an external device, and when an emergency switch was pressed. The user can play back thumbnail images by narrowing down conditions corresponding to such events for photography.

Furthermore, patent document 4 (Jpn. Pat. Appln. KOKAI Publication No. 2013-117998) proposes a technique of displaying marks of violation or dangerous driving on a map in a drive recorder. Specifically, from a moving picture acquired by constant cyclic photography, images in cases in which predetermined trigger conditions were satisfied are stored in a memory card. The trigger conditions are values corresponding to traffic violation or dangerous driving, these values being gravitational acceleration information detected from an acceleration sensor, velocity information detected from a vehicle speed sensor, etc. Accordingly, the marks and associated values are displayed such that it is easily understandable where on the map an excessive speed occurred, where a rapid acceleration occurred, where a rapid deceleration occurred, etc.

BRIEF SUMMARY OF THE INVENTION

An image playback apparatus according to the present invention includes: an image acquisition device configured to acquire, in association with a plurality of sensing functions capable of being activated or inactivated, photography image information automatically photographed under a predetermined photography condition, based on a sensing result of the activated sensing function, the image acquisition device being configured to acquire the photography image information together with trigger information indicative of the photography condition or the sensing function used under the photography condition; a display device configured to display an image; and a display controller configured to cause the display device to display the trigger information acquired by the image acquisition device, in association with the photography information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of functional circuitry of a digital camera according to a first embodiment of the present invention;

FIG. 4 is a flowchart illustrating the content of processing at a time of an automatic photography operation in a separate-type digital camera according to the first embodiment;

FIG. 7 is a view illustrating an image display example on the smartphone according to the first embodiment;

FIG. 8 is a block diagram illustrating the configurations of functional circuitries of a sensor terminal and a digital camera according to a second embodiment of the present invention;

DETAILED DESCRIPTION OF THE INVENTION

First Embodiment

Figure 2:
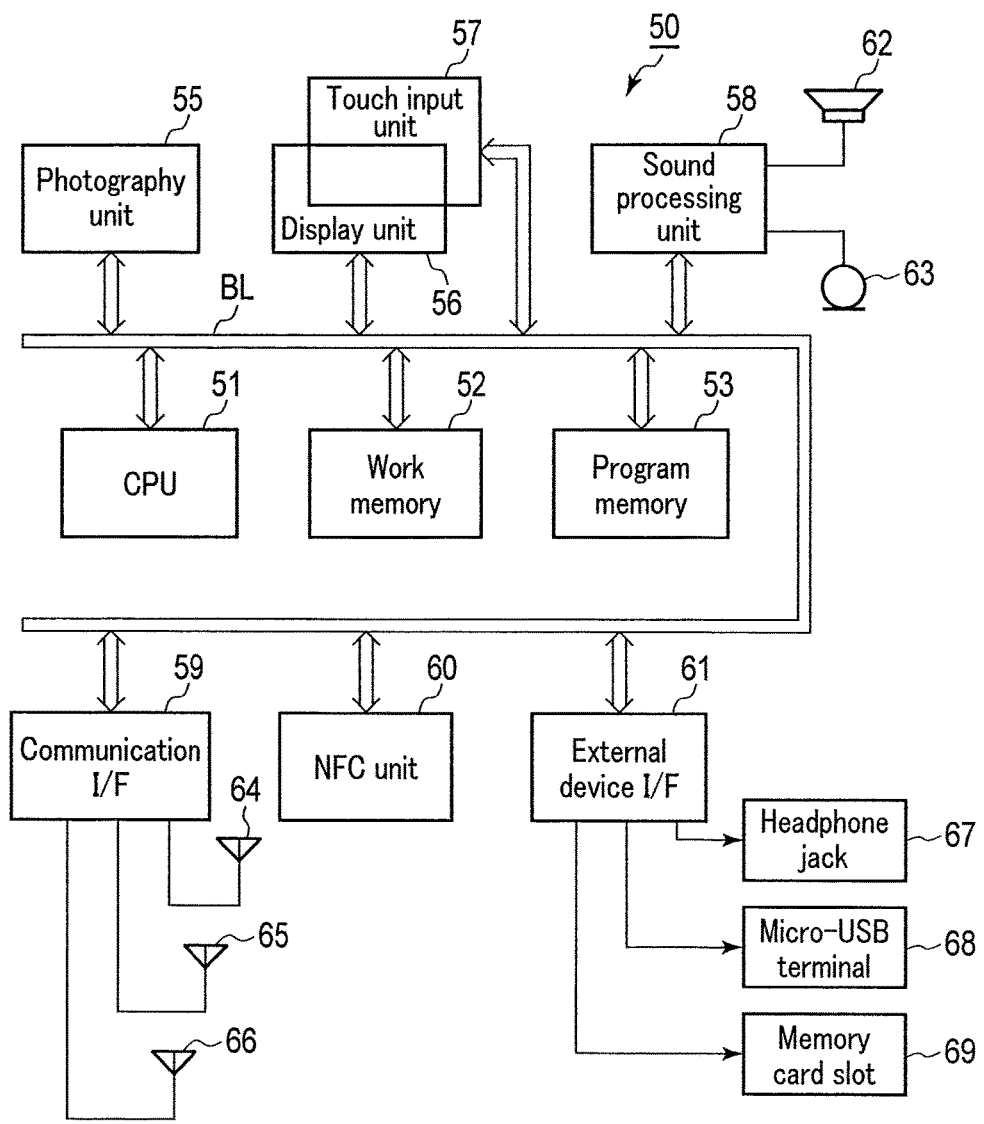
FIG. 2 is a block diagram illustrating the circuitry configuration of a smartphone according to the first embodiment.

Hereinafter, a first embodiment of the present invention will be described in detail.

In the present embodiment, a photography condition is set in a smartphone in which an application program dedicated to a digital camera is preinstalled. The set content is transferred from the smartphone to the digital camera. An image data group obtained by automatic photography by the digital camera is transferred and recorded in the smartphone, as needed. In the smartphone, as one function of the application program, the recorded images can be viewed and displayed as an album.

FIG. 1 is a block diagram illustrating the configuration of functional circuitry of a digital camera 10. This digital camera 10 is of a separate type, and a camera unit 10A and a main body unit 10B are wirelessly connected by Bluetooth (trademark) technology which is a short-range wireless communication standard.

In the camera unit 10A, a photography unit 11, a GPS (Global Positioning System) receiver 12, a geomagnetism sensor 13, a triaxial acceleration sensor 14, a gyrosensor 15, a photography controller 16, a short-range wireless communication unit 17, an atmospheric pressure sensor 18 and an operation unit 19 are interconnected via a bus B1.

The photography unit 11 is configured to include a lens optical system, a solid-state image sensor by, for example, a CMOS image sensor, driving circuits of the lens optical system and the solid-state image sensor, and an A/D converter. Image data, which is acquired by photography and digitized, is sent to the photography controller 16 via the bus B1.

The GPS receiver 12 receives incoming electric waves from a plurality of GPS satellites (not shown), to be more specific, at least four GPS satellites, via the GPS antenna 20. The GPS receiver 12 executes predetermined arithmetic operations, thereby calculating information of a latitude, longitude and altitude of a present position, and information of a present time instant, and sends the calculated result to the photography controller 16.

The geomagnetism sensor 13 detects information of a direction in which the lens optical system of the photography unit 11 faces, based on a magnetic north direction at the point of the geomagnetism sensor 13.

The triaxial acceleration sensor 14 detects accelerations in mutually orthogonal three axial directions, and can detect the attitude of the camera unit 10A, based on the direction of the gravitational acceleration.

The gyrosensor 15 is composed of a vibrating structure gyroscope. The gyrosensor 15 is used in order to analyze, in combination with the output of the triaxial acceleration sensor 14, the movement of a user who wears the camera unit 10A.

The photography controller 16 is configured to include a processor which executes overall control of the operation of the camera unit 10A side, a program memory which stores an operation program of the processor, and a work memory for executing this program.

The short-range wireless communication unit 17 is wirelessly connected to the main body unit 10B side via a short-range communication antenna 21, for example, by SMART of Bluetooth (trademark) or ANT+. In addition, by executing a pairing process in advance, for example, when images of cycling are photographed by the digital camera 10, the short-range wireless communication unit 17 receives heartbeat data which is sent from an electrocardiograph chest-belt for heartbeat detection that is worn on the chest of the user.

The atmospheric pressure sensor 18 is, for example, an electrostatic capacity type or piezoresistive sensor which detects an atmospheric pressure. The atmospheric pressure sensor 18 can also estimate the altitude of the present position, based on the detected output.

The operation unit 19 includes a power key, a shutter button, and an operation key such as a focal distance varying key in the case in which the lens optical system of the photography unit 11 includes a variable focus system lens. The operation unit 19 sends a key operation signal, which corresponds to the key operation, to the photography controller 16 via the bus B1.

On the other hand, in the main body unit 10B which is wirelessly connected to the camera unit 10A, a recording controller 31, a short-range wireless communication unit 32, a monitor display unit 33, a recording unit 34 and an operation unit 35 are interconnected via a bus B2.

The recording controller 31 is configured to include a processor which executes overall control of the operation of the main body unit 10B side, a program memory which stores an operation program of the processor, and a work memory for executing this program.

The short-range wireless communication unit 32 is wirelessly connected to the camera unit 10A side via a short-range communication antenna 36, for example, by Bluetooth (trademark) technology of Class 2 (communication distance: about 10 [m]). In addition, by executing a pairing process in advance, for example, the short-range wireless communication unit 32 is also wirelessly connected to a smartphone in which an application program dedicated to this digital camera 10 has already been installed. The short-range wireless communication unit 32 receives setting information of a photography condition in the case in which automatic photography is executed on the camera unit 10A side, and transfers image data, which is sent from the camera unit 10A, to the smartphone.

The monitor display unit 33 is composed of a backlight-equipped color liquid crystal panel, and driving circuits thereof. The monitor display unit 33 displays images, setting content, etc., as needed.

The recording unit 34 includes a nonvolatile memory which is built in the main body unit 10B and is not detachable, and a memory card which is attachable and detachable from the outside. The recording unit 34 records image data which is sent from the camera unit 10A by photography. In addition, the recording unit 34 may be provided on the camera unit 10A side, and such a configuration may be adopted that while many images are recorded in the camera unit 10A, photographed images can be confirmed on the main body unit 10B or the smartphone.

The operation unit 35 includes a power key, a playback key, a cursor key, etc. The operation unit 35 sends a key operation signal, which corresponds to the key operation, to the recording controller 31 via the bus B2.

Next, referring to FIG. 2, a description will be given of a block diagram illustrating the functional configuration of electronic circuitry of a smartphone 50 which is used in combination with the digital camera 10. In FIG. 2, reference numeral 51 denotes a microprocessor (CPU) which executes a control operation of the entirety of the smartphone 50. The following components are connected to the CPU 51 via a bus BL: a work memory 52, a program memory 53, a photography unit 55, a display unit 56, a touch input unit 57, a sound processing unit 58, a communication interface (I/F) 59, an NFC (Near Field Communication) unit 60, and an external device interface (I/F) 61.

The work memory 52 is composed of, for example, a DRAM, and functions as a main memory of the CPU 51.

The program memory 53 is composed of a nonvolatile memory, and stores an OS for enabling the CPU 51 to operate, various application programs including an application program dedicated to the digital camera 10, fixed data, etc.

The photography unit 55 is composed of a lens optical system, and a solid-state image sensor such as a CMOS image sensor. The photography unit 55 digitizes image signals obtained by photography, forms data files of the digitized image signals with data compression being executed, and sends the data files to the CPU 51.

The display unit 56 is composed of a backlight-equipped color liquid crystal panel, and driving circuits thereof. A touch input unit 57, in which a transparent electrode film is used, is formed integral with this display unit 56. The touch input unit 57 digitizes a time-series coordinate signal corresponding to a user's touch operation, and sends the digitized signal to the CPU 51 as a touch operation signal.

The sound processing unit 58 includes a sound source circuit such as a PCM sound source. The sound processing unit 58 generates an analog sound signal in accordance with sound data which is delivered, and produces amplified sound from a speaker 62. On the other hand, the sound processing unit 58 digitizes an analog sound signal which is input from a microphone 63, and creates a sound data file.

By using the speaker 62 as a receiver and using the microphone 63 as a transmitter, voice communication is enabled.

The communication interface 59 wirelessly communicates with networks (not shown) by using antennas 64, 65 and 66, based on techniques of a 4G-mobile phone system, wireless LAN of IEEE802.11a/b/g/n standards, and Bluetooth (trademark) of IEEE802.15.1 standard.

The NFC unit 60 executes, when connected to other NFC devices, data transmission/reception by using NFC technology, so as to enable the smartphone 50 to function as a service card of electronic money or point services.

The external device interface 61 enables connection or attachment of, for example, a headphone, an earphone, a USB device such as an external hard disk drive or a USB memory, and a memory card, via a headphone jack 67, a Micro-USB terminal 68 and a memory card slot 69.

Next, the operation of the present embodiment will be described.

Figure 3:
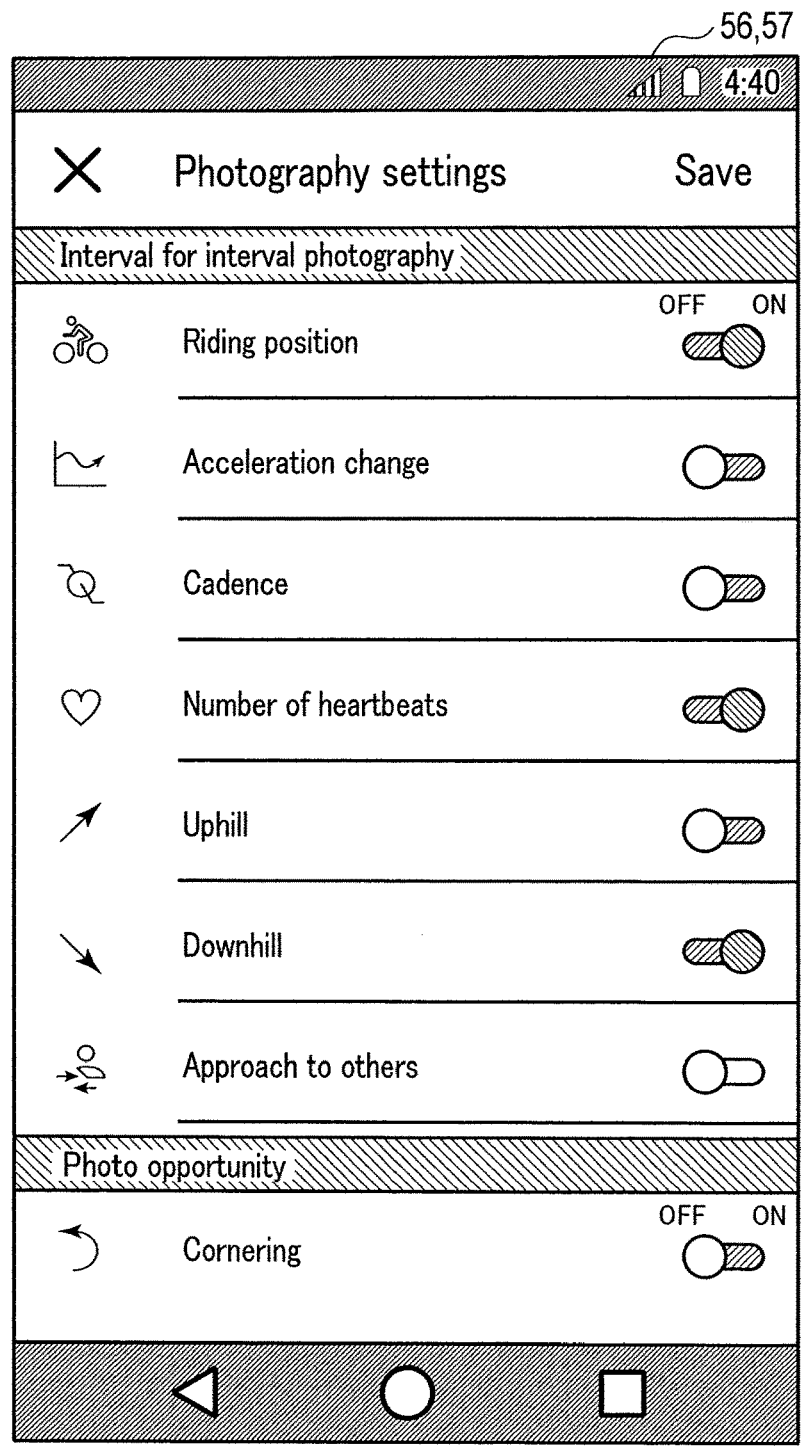
FIG. 3 is a view illustrating a screen on the smartphone for executing automatic photography settings of the digital camera according to the first embodiment.

FIG. 3 is a view illustrating a screen in a case in which the application program dedicated to the digital camera 10, which is preinstalled in the smartphone 50, is started. FIG. 3 illustrates a state in which a screen for setting a photography condition of automatic photography by the digital camera 10 is opened.

In the present case, when the user uses the digital camera 10 in cycling, the user wears the camera unit 10A on the upper body of the user, for example, on a cycle helmet. In this case, it is assumed that a photography condition for automatic photography is set. Concrete items of the photography condition are "Riding position", "Acceleration change", "Cadence", "Number of heartbeats", "Uphill", "Downhill", "Approach to others", and "Cornering".

The item "Riding position" indicates that the user has transitioned to a dancing (standing pedaling) state. This state is judged based on detection outputs of the triaxial acceleration sensor 14 and gyrosensor 15. At the initial timing of the transition to this state, automatic photography is executed.

As regards the item "Acceleration change", rapid acceleration or rapid deceleration is judged from a detection output of the triaxial acceleration sensor 14. By setting the threshold of the acceleration, the automatic photography is executed at the time when the acceleration exceeds the threshold.

The item "Cadence" indicates the number of rotations per minute of the pedal crank of the bicycle. This number of rotations of the crank is judged from the detection outputs of the triaxial acceleration sensor 14 and gyrosensor 15. The automatic photography is executed at timing when the cadence has exceeded a preset number of rotations of the crank.

The item "Number of heartbeats" is a counted number of heartbeats represented by signals which are received by the short-range wireless communication unit 17 via the short-range communication antenna 21 from the electrocardiograph chest-belt which the user wears. The automatic photography is executed at timing when the number of heartbeats has exceeded a preset threshold.

The items "Uphill" and "Downhill" are calculated by the degree of variation of the time-based altitude information of the present position, which is obtained by the GPS antenna 20 and GPS receiver 12. By setting inclination angles which are thresholds of acclivity and declivity, the automatic photography is executed at timing when the inclination angle has exceeded the threshold.

As regards the item "Approach to others", a recognition process of a person is executed with respect to an image in a monitoring state, which is obtained by the photography unit 55. When a person appears in this image, the "Approach to others" is judged based on a focal distance of the person. The automatic photography is executed at timing when the person has approached within a preset distance. Besides, the "Approach to others" can be judged wirelessly. Specifically, by using LE technology of Bluetooth (trademark), electric field strength information is transmitted and received without performing pairing in advance, and, when the electric field strength has exceeded a certain value, the approach is determined. In addition, when the above-described person is set as a subject, or when the person is holding the smartphone 50, the distance between the subject and the photography unit 55 can be measured from the above-described focal distance. Then, this distance can be set as the condition for automatic photography.

The item "Cornering" is judged from the detection output of the triaxial acceleration sensor 14. By setting a threshold of the acceleration, the automatic photography is executed at timing when the acceleration has exceeded this threshold in a direction other than the direction in which the gravitational acceleration is obtained. In addition, the "Cornering" can also be detected by using an angular velocity based on the output of the gyrosensor 15.

FIG. 3 illustrates, by way of example, the state in which "Riding position", "Number of heartbeats" and "Downhill" are set in the ON state as conditions for automatic photography.

The user can arbitrarily select which of the conditions is to be set in the ON state, that is, which of the sensors is to be activated.

It is assumed that, as the item "Number of heartbeats", for example, a threshold of 110 [bpm] (110 heartbeats per minute) can be set. In addition, it is assumed that, as the item "Downhill", for example, a threshold such as declivity 10 [%] can be set. As regards the other conditions, too, it is assumed that not only the ON/OFF is simply set, but also thresholds can variously be set as needed.

Furthermore, the ON/OFF of the automatic photography condition does not simply correspond to the ON/OFF of the sensor in a one-to-one correspondence. A plurality of pieces of sensing information can be taken out from one sensor, or pieces of sensing information from a plurality of sensors may be subjected to an arithmetic operation and one photography condition can be obtained. For example, measurement information of brightness can be taken out from the solid-state image sensor, and measurement information of a color can also be taken out from the solid-state image sensor.

Aside from the above-described items, automatic photography may be executed, for example, when altitude information (height above sea level) at the present position, which is obtained by the GPS antenna 20 and GPS receiver 12, has reached a preset unit of a round number, e.g. a unit of 100 [m].

By sending the photography condition, which was thus set by the smartphone 50, to the camera unit 10A via the main body unit 10B and setting up this photography condition in the camera unit 10A, the camera unit 10A can execute automatic photography at a time point when the set-up photography condition has been satisfied.

FIG. 4 is a flowchart illustrating the content of processing of automatic photography, which is executed under the control by the photography controller 16 in the camera unit 10A of the digital camera 10.

As illustrated in FIG. 4, the photography controller 16 judges, based on detection outputs of various set-up sensors, whether at least one of one or plural photography conditions, which are set by the smartphone 50, is established or not (step S101). If the photography controller 16 judges that the photography condition is not established (No in step S101), the photography controller 16 returns to the process of step S101. In step S101, the photography conditions, which are set in the OFF state as illustrated in FIG. 3, are not set as targets of judgment.

The photography controller 16 stands by until the set-up photography condition is established, by repeatedly executing the judgment process of step S101.

At the time point when the set-up photography condition is established (Yes in step S101), the photography controller 16 judges whether or not the automatic photography is successive and overlapping photography in the same state (step S102). Specifically, the photography controller 16 judges whether a preset predetermined time, for example, 30 [seconds], has passed since the time point of previous automatic photography when the same photography condition was established.

Incidentally, this judgment as to whether the predetermined time has passed or not may be executed on the smartphone 50 side, and an instruction for photography may be sent to the photography controller 16.

Here, if the photography controller 16 judges that the predetermined time has not passed since the automatic photography was executed under the same photography condition, and that automatic photography to be executed becomes the successive and overlapping photography in the same state (No in step S102), the photography controller 16 returns to the process from step S101, without executing the photography operation.

On the other hand, if the photography controller 16 judges that the predetermined time has passed since the automatic photography was executed under the same photography condition, and that automatic photography to be executed is not the successive and overlapping photography in the same state (Yes in step S102), the photography controller 16 then executes the automatic photography operation (step S103).

Furthermore, the photography controller 16 embeds the photography condition at the time of executing the automatic photography and the detection value (sensor output value) thereof, together with prescribed metadata based on the Exif (Exchangeable image file format), into an image data file of, e.g. JPEG (Joint Photographic Experts Group) format (step S104). Incidentally, as well as this detection value, detection values of other various sensors, which are obtained at that time point, may also be included.

Here, when there are photography conditions at the time when the automatic photography is executed, the respective established photography conditions and their detection values are embedded together with the detection values of other various sensors.

The above-described metadata includes the date/time of photography; the name of the maker of the photography device; the model name of the photography device; the resolution (image size) of the entire image; the resolution per unit in the horizontal and vertical directions; the direction (azimuth) of photography; shutter speed; aperture F value; ISO sensitivity; photometric mode; presence/absence of a flash; exposure correction step value; focal distance; color space; GPS information; and a thumbnail image (image format ".bmp" of 160×120 pixels).

The photography conditions and the detection values thereof are, for example, those in such cases that the heartbeat value of 126 [bpm] was obtained with the threshold being set at 110 [bpm], and the cadence of 115 [rpm] was obtained with the threshold being set at 100 [rpm].

After embedding the photography condition together with the metadata of Exif into the image data file, the photography controller 16 sends this image data file to the main body 10B side, and causes the recording unit 34 of the main body unit 10B to record the image data file (step S105).

In the above manner, the photography controller 16 completes the series of processes from the establishment of the preset photography condition, to the execution of automatic photography, and to the recording of the image data file. Thereafter, the photography controller 16 returns to the process from step S101, in preparation for the next automatic photography.

If the photography controller 16 executes the automatic photography on the basis of the series of processes illustrated in FIG. 4, the image data file obtained by the photography is accumulated and recorded, as needed, in the recording unit 34.

Furthermore, the user carries the smartphone 50 in close proximity to the main body unit 10B of the digital camera 10. Thereby, the image data file recorded in the recording unit 34 is transferred to and stored in an image data folder in the memory card, this image data folder being dedicated to the digital camera 10. The application program dedicated to the digital camera 10 is installed in the smartphone 50. In addition, the image data file recorded in the recording unit 34 is automatically transferred to and stored in a predetermined data folder on the smartphone 50 side, for example, the image data folder of the memory card which is attached to the memory card slot 69.

Figure 5:
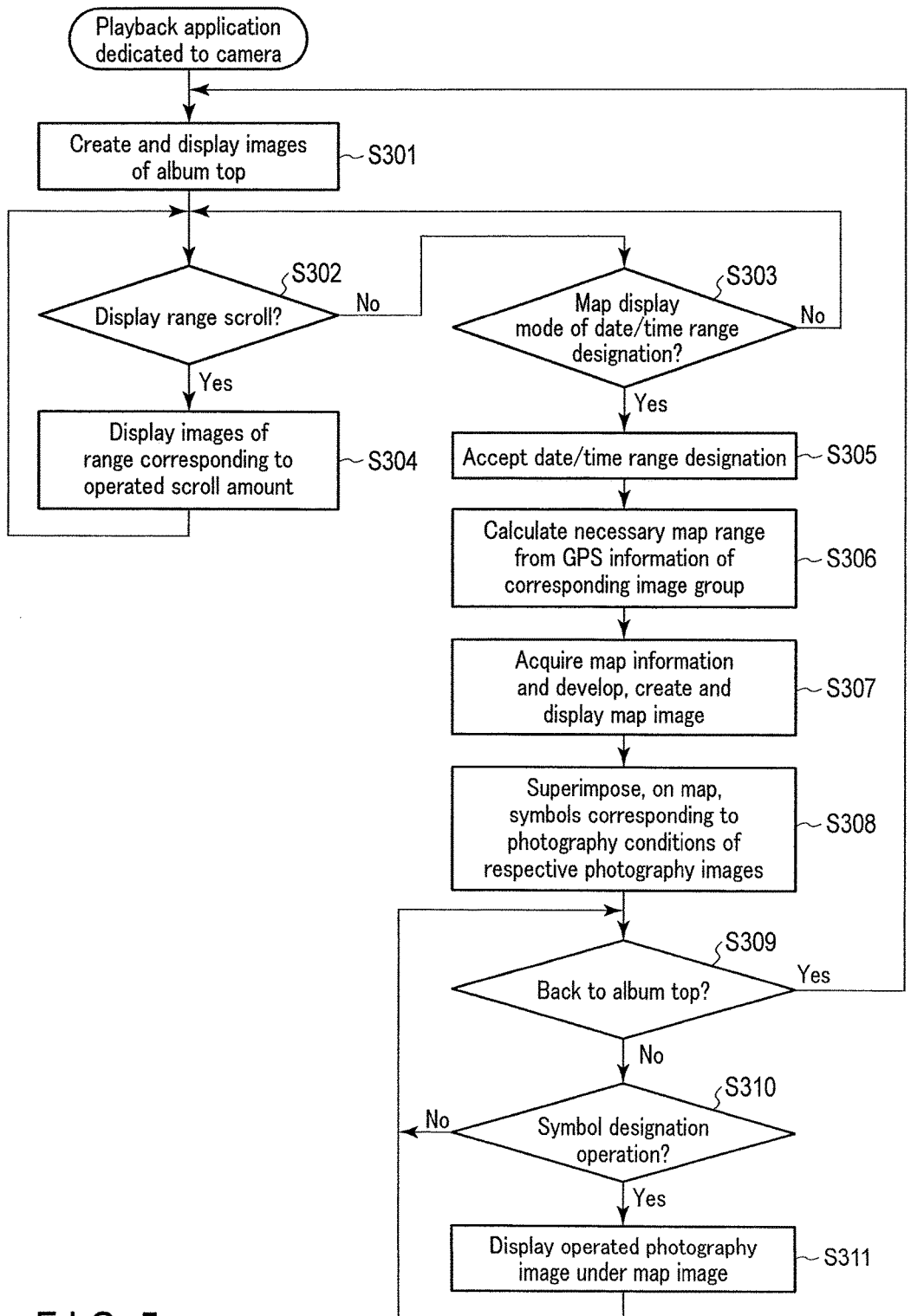
FIG. 5 is a flowchart illustrating the content of processing of an application program for image display of the smartphone according to the first embodiment.

Next, referring to FIG. 5, a description will be given of a process in a case in which the smartphone 50 plays back an album image according to the application program dedicated to the digital camera 10.

This application program is executed after the CPU 51 reads out the application program from the program memory 53, and develops and loads the application program in the work memory 52.

Upon starting the application program, the CPU 51 reads out the image file data which is stored in a predetermined image data folder of the memory card which is attached to the memory card slot 69. Specifically, the CPU 51 reads out the image file data in the order beginning with the latest date/time of photography, thereby creating list images which become the album top, and displaying the list images on the display unit 56 (step S301).

Figure 6:
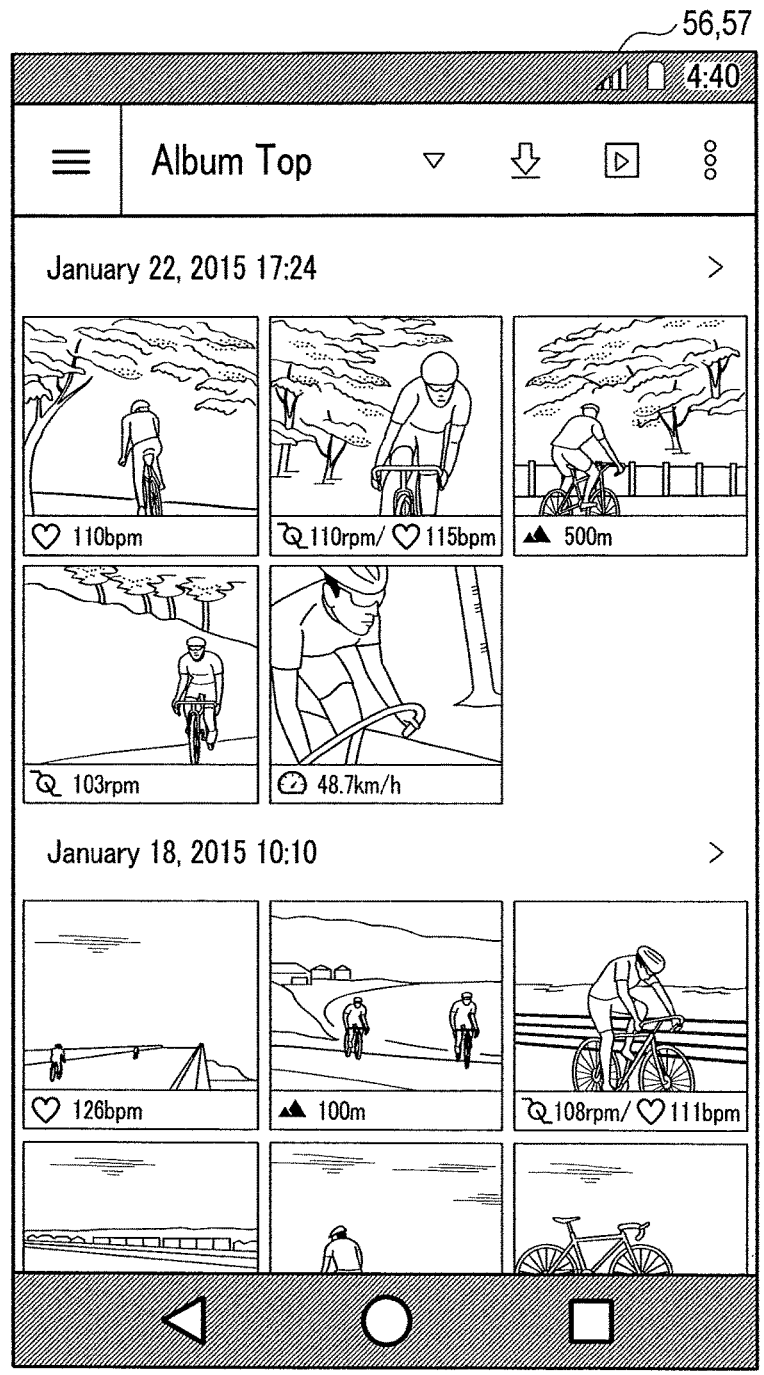
FIG. 6 is a view illustrating a display example of list images of an album top on the smartphone according to the first embodiment.

FIG. 6 is a view illustrating a state in which list images of the album top are displayed. Here, FIG. 6 illustrates an example of the screen in the case of selecting such setting that images are grouped on a date-by-date basis, and are displayed together. The respective images are displayed in a table form by using thumbnail images in the metadata of the recorded images. In addition, in the case in which the respective images were captured by automatic photography, the factors of photography conditions, together with concrete numerical values, are displayed at lower end parts of the images.

For example, an image displayed at an upper left end indicates, by a heart-shaped symbol sign and numerical value "110 [bpm]", that this image was automatically photographed upon detecting that the heartbeat value exceeded the threshold.

An image displayed at an upper middle end, which neighbors the above-described image to the right side, indicates, by a symbol sign of a pedal crank and numerical value "110 [rpm]" of the number of rotations and the heart-shaped symbol sign and numerical value "115 [bpm]", that this image was automatically photographed upon detecting that the cadence exceeded the threshold and the heartbeat value exceeded the threshold.

Besides, in this manner, a symbol sign of a mountain and the height above sea level ([m]) in the case in which the photography condition is "altitude information (height above sea level)", and a symbol sign of an analog meter and a speed value ([km/h]) in the case in which the photography condition is "running speed", are additionally displayed at lower end parts of the associated images. Thereby, these images can be displayed such that it is understandable, at a glance, under which conditions these images were automatically photographed, and what were the values which exceeded the photography conditions at that time point.

The CPU 51 judges, based on a detection signal from the touch input unit 57, whether the screen was scroll-operated from the state in which the list images of the above album top were displayed (step S302).

Here, if the CPU 51 judges that the screen is not scroll-operated (No in step S302), the CPU 51 judges whether a menu item for transitioning to a map display mode of date/time range designation was designated or not (step S303).

It is assumed that this map display mode of date/time range designation can be selected, for example, by touch-operating a symbol "∇" for displaying various menus, which is located on the right side of "Album Top" on the upper end in FIG. 6.

Here, if the CPU 51 judges that the menu item for transitioning to the map display mode of date/time range designation is not designated (No in step S303), the CPU 51 returns to the process from step S302.

Thus, by repeatedly executing the process of step S302 and step S303, the CPU 51 stands by until the screen is scroll-operated, or the map display mode of date/time range designation is designated.

If the CPU 51 judges in step S302 that the screen was scroll-operated (Yes in step S302), the CPU 51 determines the scroll amount, based on a detection signal from the touch input unit 57, and then moves the display range of the list images by the scroll amount (step S304). After this process, the CPU 51 returns to the process from step S302.

In the present embodiment, the case of displaying the thumbnail images of plural photography images in the table form on the display unit 56 of the smartphone 50 was described reference to FIG. 6. However, the restriction to this is unnecessary. Specifically, in the case of a device such as a wrist terminal which has a limited display capacity, thumbnail images may be displayed one by one, together with, for example, the symbol sign representing the shutter trigger of photography. The image to be displayed may successively be changed and updated by the scroll operation on the screen.

Referring back to FIG. 5, if the CPU 51 judges in step S303 that the menu item for transitioning to the map display mode of date/time range designation is designated (Yes in step S303), the CPU 51 accepts the start date/time and the end date/time of the date/time range by the display and touch operations on the display unit 56 and touch input unit 57 (step S305).

In accordance with the accepted date/time range designation, the CPU 51 reads out, from the corresponding image folder in the memory card attached to the memory card slot 69, all images corresponding to the photography dates/times within the date/time range. Furthermore, based on the GPS information included in the metadata of Exif, the CPU 51 calculates a necessary map range, to be more specific, calculates a necessary map range in accordance with a greater one of the differences between the minimum value and maximum value of the latitude and between the minimum value and maximum value of the longitude (step S306).

Next, the CPU 51 acquires necessary map information from a pre-registered server apparatus via the communication interface 59, develops and creates the corresponding map image, and causes the display unit 56 to display the map image (step S307).

Furthermore, based on the GPS information in the metadata of Exif, which is added to the image data in step S306, and the information of photography conditions, the CPU 51 superimposes and displays the symbol sign of the photography condition of each image at the corresponding position on the image displayed on the display unit 56 (step S308).

Subsequently, the CPU 51 judges whether an operation for releasing the map display mode is executed or not (step S309). This judgment is made, for example, by displaying a leftward arrow "←" on the left side of the upper end of the screen, and by determining whether this arrow is operated or not.

Here, if the CPU 51 judges that the operation for releasing the map display mode is not executed (No in step S309), the CPU 51 judges whether any one of symbol signs of arbitrary photography conditions on the map image is designated and operated (step S310).

If the CPU 51 judges that the symbol sign of the photography condition on the map image is designated and operated (No in step S310), the CPU 51 returns to the process from step S309.

In this manner, by repeatedly executing the process of steps S309 and S310, the CPU 51 stands by until the operation for releasing the map display mode is executed, or the symbol sign of the photography condition on the map image is designated and operated.

If the CPU 51 judges in step S310 that one of the symbol signs of arbitrary photography conditions on the map image is designated and operated (Yes in step S310), the CPU 51 arranges and displays the photography images corresponding to this symbol sign immediately under the map image (step S311). After this process, the CPU 51 returns to the process from step S309.

FIG. 7 illustrates an image which is displayed on the display unit 56 by the process of step S311. Here, FIG. 7 illustrates an example in which images obtained by the designation operation are arranged and displayed immediately under a map image MI. Specifically, a symbol sign of "Uphill" and a numerical value "(Acclivity) 10.5 [%]" are added to the image, and other detection values of various sensors at that time point are also displayed. Thereby, it is possible to very easily understandably present under which photography condition the image was automatically photographed, and how the other conditions were set.

Referring back to FIG. 5, if the CPU 51 judges in step S309 that the operation for releasing the map display mode is executed (Yes in step S309), the CPU 51 returns to the process from step S301.

In the meantime, in the present embodiment, the case in which the user uses the digital camera 10 in cycling was described by way of example. However, the restriction to this is unnecessary. Specifically, the purpose of use of the digital camera 10 and the method of setting the condition, which serves as the shutter trigger of photography in the automatic photography, are not limited to those described in the present embodiment. For example, in diving, it is thinkable that automatic photography is executed by detecting a change in water pressure, a sharp decrease in exposure amount, a stop in attitude of the camera housing, etc.

In addition, the number of conditions, which serve as shutter triggers, may not be one. The shutter may be triggered when all of a plurality of conditions are satisfied (AND), or when any one of a plurality of conditions is satisfied (OR).

Besides, in the case of the camera 10 in which the camera unit 10A and main body unit 10B are separated as illustrated in FIG. 1, the condition, which serves as the shutter trigger, may be set in the camera unit 10A, or the condition may be set in the main body unit 10B and may be sent to the camera unit 10A.

Additionally, the map image may be created each time the photography image information is displayed, or the map image may be prepared in advance and information indicative of the photography position may be superimposedly displayed.

Additionally, in this embodiment, the symbol sign of the condition, which served as the shutter trigger, is simultaneously displayed by being added at the end portion of the image. However, the restriction to this display mode is unnecessary. For example, by adding a leader line to the displayed image, the symbol sign of the condition serving as the shutter trigger may be displayed at a remote position. Besides, for example, like an index display for a plurality of images, the symbol signs of the conditions, which serve as the shutter triggers, may be displayed together.

Additionally, it is possible to intentionally not display, at first glance, the symbol signs, etc. of the conditions, which serve as the shutter triggers. Instead, such a configuration may be adopted that the symbol signs, etc. of the conditions, which serve as the shutter triggers, appear and are displayed in the state in which a click operation was executed on an arbitrary image, or the cursor was moved onto this image.

As regards the information of the shutter trigger which is associated with the images, a plurality of conditions may be associated and displayed if the conditions are satisfied within a predetermined time relating to photography.

When an individual image, which is selected from among the images, is viewed, information other than the information of the first photography condition, which is critical in the execution of automatic photography, can also be displayed. In this case, it is preferable that the information of the critical photography condition can be distinguished from other symbol signs, etc., in particularly, by highlight coloring or the like.

Additionally, the acquired plural images can be sorted by the kind of the photography condition which served as the shutter trigger, and the images can be selected more specifically by being combined with the map information.

As has been described above in detail, according to the present embodiment, the user can easily understand what was used as the shutter trigger when the image was automatically photographed, and the user can easily select a desired image.

Additionally, in the present embodiment, in accordance with each of the photographed images, the symbol sign representing the condition for photographing this image is additionally displayed. Thus, it is possible to present, in an easily understandable form, under which photography condition the automatic photography was executed, together with the photographed image itself.

Additionally, in this embodiment, the photographed image additionally includes the information relating to the position. When the photographed image is designated, the map image is created based on the position information of the image, and the symbol sign representing the photography condition is superimposedly displayed on the created map image at the corresponding position of each photographed image. Thereby, it is possible to present, in an easily understandable form, in what process the automatic photography is executed, and to present, for example, the tendency of the process in which the automatic photography is executed.

Furthermore, in this embodiment, the concrete value and unit in the state in which the photography condition was established can be displayed as well as the symbol sign of the photography condition which is displayed in addition to the image. Thereby, the process leading to the actual photography can easily be understood.

Second Embodiment

Hereinafter, a second embodiment of the present invention will be described in detail.

In the present embodiment, a photography condition is set in the smartphone in which the application program dedicated to the digital camera is preinstalled. The set content is transferred from the smartphone to the digital camera. In the digital camera, in accordance with detection outputs of various sensors which are sent from a separate sensor terminal, the wearer of the sensor terminal is automatically photographed as a subject at timing when the set condition is established.

An image data group obtained by automatic photography by the digital camera is transferred and recorded in the smartphone, as needed. In the smartphone, as one function of the above-described application program, the recorded images can be viewed and displayed as an album.

FIG. 8 is a block diagram illustrating the configuration of functional circuitry of a sensor terminal 70 and a digital camera 90. The sensor terminal 70 and digital camera 90 are wirelessly connected by, for example, Bluetooth (trademark) technology which is a short-range wireless communication standard.

The sensor terminal 70 is, for example, a wristwatch-type wrist terminal which a person who becomes a subject wears. In the sensor terminal 70, a GPS receiver 71, a triaxial acceleration sensor 72, a gyrosensor 73, a geomagnetism sensor 74, an atmospheric pressure sensor 75, a detection controller 76, an operation unit 78 and a heartbeat sensor 79 are interconnected via a bus B3.

The GPS receiver 71 receives incoming electric waves from a plurality of GPS satellites (not shown), to be more specific, at least four GPS satellites, via the GPS antenna 80. The GPS receiver 71 executes predetermined arithmetic operations, thereby calculating information of a latitude, longitude and altitude of a present position, and information of a present time instant, and sends the calculated result to the detection controller 76.

The triaxial acceleration sensor 72 detects accelerations in mutually orthogonal three axial directions, and can detect the attitude of the sensor terminal 70, based on the direction of the gravitational acceleration.

The gyrosensor 73 is composed of a vibrating structure gyroscope. The gyrosensor 72 is used in order to analyze, in combination with the output of the triaxial acceleration sensor 72, the movement of the wearer of the sensor terminal 70.

The geomagnetism sensor 74 detects information of a direction in which the wearer of the sensor terminal 70 faces, based on a magnetic north direction at the point of the geomagnetism sensor 74.

The atmospheric pressure sensor 75 is, for example, an electrostatic capacity type or piezoresistive sensor which detects an atmospheric pressure. The atmospheric pressure sensor 75 can also estimate the altitude of the present position, based on the detected output.

The detection controller 76 is configured to include a processor which executes overall control of the operation of the sensor terminal 70, a program memory which stores an operation program of the processor, and a work memory for executing this program.

The short-range wireless communication unit 77 is wirelessly connected to the digital camera 90 side via a short-range communication antenna 81 by Bluetooth (trademark).

The operation unit 78 includes a simple operation key such as a power key, and sends a key operation signal, which corresponds to the key operation, to the detection controller 76 via the bus B3.

The heartbeat sensor 79 is an optical-type heartbeat sensor which is provided on the back surface side of the wrist terminal and detects heartbeats from the dilation and contraction of a blood vessel of the wrist of the wearer.

On the other hand, in the digital camera 90 which photographs the wearer of the sensor terminal 70 as the subject, a photography unit 91, a short-range wireless communication unit 92, a monitor display unit 93, a photography/recording controller 94, a recording unit 95 and an operation unit 96 are interconnected via a bus B4.

The photography unit 91 includes a lens optical system, a solid-state image sensor by a CMOS image sensor or a CCD sensor, driving circuits of the lens optical system and the solid-state image sensor, and an A/D converter. Image data, which is acquired by photography by the photography unit 91 and digitized, is sent to the photography/recording controller 94 via the bus B4.

The short-range wireless communication unit 92 is wirelessly connected to the sensor terminal 70 via a short-range communication antenna 97, for example, by Bluetooth (trademark) technology of Class 2 (communication distance: about 10 [m]). In addition, by executing a pairing process in advance, the short-range wireless communication unit 92 is also wirelessly connected to a smartphone in which an application program dedicated to this digital camera 90 has already been installed. The short-range wireless communication unit 92 receives setting information of a photography condition in the case in which automatic photography is executed, and transfers image data, which is automatically photographed, to the smartphone.

The monitor display unit 93 is composed of a backlight-equipped color liquid crystal panel, and driving circuits thereof. The monitor display unit 93 displays images, setting content, etc., as needed.

The photography/recording controller 94 is configured to include a processor which executes overall control of the operation of the digital camera 90, a program memory which stores an operation program of the processor, and a work memory for executing this program.

The recording unit 95 includes a nonvolatile memory which is built in the digital camera 90 and is not detachable, and a memory card which is attachable and detachable from the outside. The recording unit 95 records image data which is acquired by photography.

The operation unit 96 includes a power key, a shutter button, and an operation key such as a focal distance varying key in the case in which the lens optical system of the photography unit 91 includes a variable focus system lens. The operation unit 96 sends a key operation signal, which corresponds to the key operation, to the photography/recording controller 94 via the bus B4.

In the meantime, the functional configuration of electronic circuitry of the smartphone, which is used in combination with the digital camera 90, is the same as the functional configuration of electronic circuitry of the smartphone 50 which was described with reference to FIG. 2 of the first embodiment. Thus, a description thereof is omitted here, with the same parts being denoted by like reference numerals.

Next, the operation of the present embodiment will be described.

The photography condition, which is set by the smartphone 50, is sent to, and set in, the digital camera 90. Thereby, the digital camera 90 can automatically execute photography at a time point when the set photography condition is established.

Figure 9:
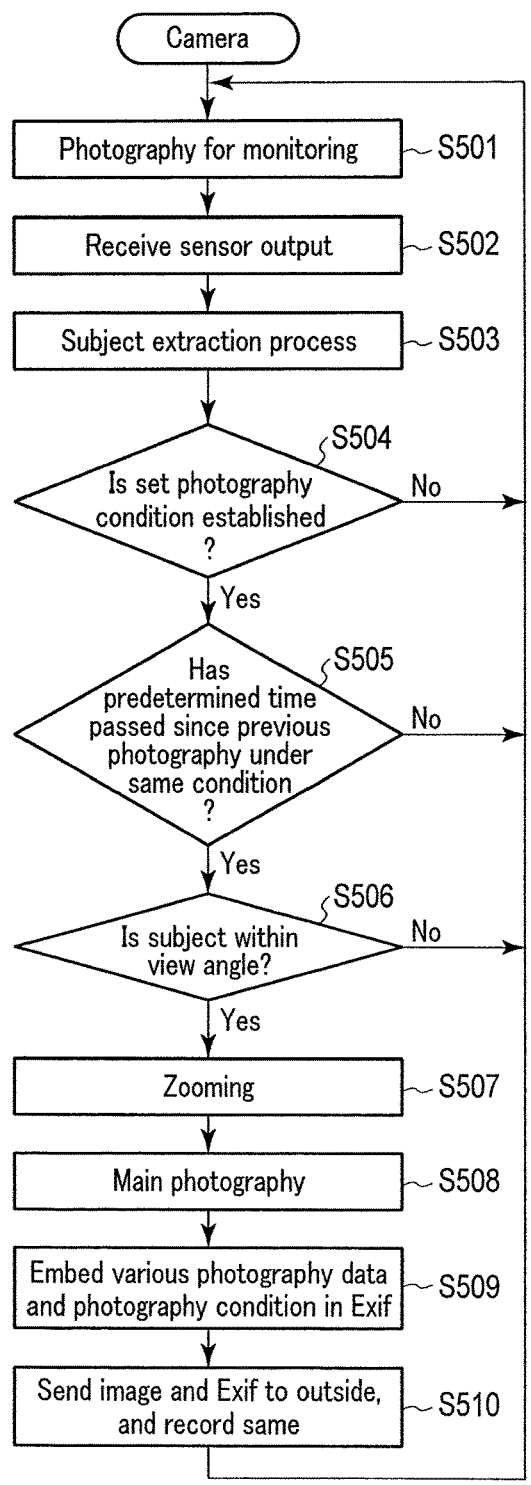
FIG. 9 is a flowchart illustrating the content of processing at a time of image photography in a digital camera according to the second embodiment.

FIG. 9 is a flowchart illustrating the content of processing of automatic photography, which is executed under the control by the photography/recording controller 94 in the digital camera 90.

As illustrated in FIG. 9, the photography/recording controller 94 executes photography at a predetermined frame rate, for example, at 30 [frames/sec], for monitor display by the photography unit 91 (step S501). In this case, in order to keep the frame rate, the photography is executed by setting the shutter speed at a time of photography at, for example, a speed higher than ⅙ [sec], and by setting the aperture value which corresponds to this shutter speed by an automatic exposure process.

In conjunction with this image photography for monitoring, the photography/recording controller 94 receives each of sensor outputs from the sensor terminal 70 side (step S502).

The photography/recording controller 94 executes a subject extraction process from the image data acquired in step S501, by image processes including a contour extraction process, a face recognition process and a person extraction process (step S503).

When a plurality of persons were extracted from the image, the photography/recording controller 94 refers to a variation with time of the person who wears the sensor terminal 70, based on the various sensor outputs acquired in step S502, thereby selecting the person wearing the sensor terminal 70 and recognizing this person as the subject. Here, this variation includes an amount of the movement of the body of the person, and a direction of movement of the body in the three-dimensional space.

Furthermore, the photography/recording controller 94 judges, based on the outputs of the various sensors which are set, whether at least one of one or plural photography conditions, which are set by the smartphone 50, is established (step S504). In the meantime, the establishment of the photography condition may be judged in the sensor terminal 70 or smartphone 50, and an automatic photography instruction signal may be sent to the digital camera 90. In this case, "Yes" is determined in step S504.

If the photography/recording controller 94 judges that the photography condition is not established (No in step S504), the photography/recording controller 94 returns to the process from step S501. In this step S504, photography conditions, which are set in the OFF state, are not set as targets of judgment.

In this manner, by repeatedly executing the process of steps S501 to S504, the photography/recording controller 94 stands by until the set photography condition is established, while tracking the subject in the monitor image.

At a time point when the photography/recording controller 94 has judged that the set photography condition is established (Yes in step S504), the photography/recording controller 94 then judges whether or not the automatic photography is successive and overlapping photography in the same state from the time point when the same photography condition was established and the previous automatic photography was executed (step S505). Specifically, the photography/recording controller 94 judges whether a preset predetermined time, for example, 30 [seconds], has passed since the time point of previous automatic photography.

Incidentally, this judgment as to whether the predetermined time has passed or not may be executed on the smartphone 50 side, and an instruction for photography may be sent to the photography/recording controller 94.

If the photography/recording controller 94 judges that the predetermined time has not passed since the automatic photography was executed under the same photography condition, and that automatic photography becomes the successive and overlapping photography in the same state (No in step S505), the photography/recording controller 94 returns to the process from step S501, without executing the photography operation.

On the other hand, if the photography/recording controller 94 judges, in the process of step S505, that the predetermined time has passed since the automatic photography was executed under the same photography condition, and that automatic photography does not become the successive and overlapping photography in the same state (Yes in step S505), the photography/recording controller 94 judges whether or not the person wearing the sensor terminal 70 was successfully specified as the subject (step S506). Specifically, the photography/recording controller 94 judges whether or not the subject falls within the photography view angle, that is, whether or not the person wearing the sensor terminal 70 is successfully specified as the subject in the process of step S503.

Here, if the photography/recording controller 94 judges that the person wearing the sensor terminal 70 does not fall within the photography view angle, for example, in such a case that the person could not be recognized at all, or that the person who is the subject could not specified from among the plural persons in the process of step S503 (No in step S506), the photography/recording controller 94 returns to the process from step S501 in order to avoid a useless photography operation.

If the photography/recording controller 94 specifies the person who is the subject in the process of step S506 and judges that the subject falls within the photography view angle (Yes in step S506), the photography/recording controller 94 executes a zooming process, where necessary (step S507).

In this case, the photography/recording controller 94 executes a zooming process corresponding to zoom setting which was made in advance. For example, if the subject is located at the center of the photography range and the photography unit 91 includes a zoom lens which can successively vary the focal distance, the photography/recording controller 94 increases the focal distance by an optical zoom function, and sets the subject in the photography image to become larger.

Conversely, if the subject is located at an end portion of the photography range, the body or face appears only partly, and the photography unit 91 includes a zoom lens which can successively vary the focal distance, the photography/recording controller 94 decreases the focal distance (i.e. increases the photography view angle) by the optical zoom function, so that the subject may surely appear within the photography image.

Besides, even in the case in which the photography unit 91 is a fixed focal lens which cannot execute optical zooming, if the image size of the photography image, which is set at that time point, is sufficiently small, compared to the composition of the number of pixels of the solid-state imaging sensor which the photography unit 91 includes, a so-called digital zoom process may be executed. The digital zoom process can vary the range of an image which is cropped from the image data acquired by the photography unit 91. Thereby, the same advantageous effects as with the optical zoom can be obtained.

In addition, the above-described optical zoom and digital zoom may be combined and implemented.

Furthermore, in combination with such a scene program function that a plurality of picture compositions of images are set in advance, the subject may not only intentionally set at the center of the image, but the zoom process may also be set in consideration of the positional relationship with the background.

After the photography/recording controller 94 executed the zooming process, as needed, based on the preset content in the process of step S507, the photography/recording controller 94 then executes the automatic photography operation by the photography unit 91 (step S508).

Furthermore, the photography/recording controller 94 embeds the photography condition at the time of executing the automatic photography and the detection value (sensor output value) thereof, together with prescribed metadata based on the Exif, into an image data file of, e.g. JPEG which was acquired by the automatic photography (step S509). As well as this detection value, detection values of other various sensors, which are obtained at that time point, may also be included.

Here, when there are photography conditions at the time when the automatic photography is executed, the respective established photography conditions and their detection values are embedded together with the detection values of other various sensors.

The prescribed metadata includes the date/time of photography; the name of the maker of the photography device; the model name of the photography device; the resolution (image size) of the entire image; the resolution per unit in the horizontal and vertical directions; the direction (azimuth) of photography; shutter speed; aperture F value; ISO sensitivity; photometric mode; presence/absence of a flash; exposure correction step value; focal distance; color space; GPS information; and a thumbnail image (image format ".bmp" of 160×120 pixels).

After embedding the photography condition, together with the metadata of Exif, into the image data file, the photography/recording controller 94 sends this image data file to the external smartphone 50, and causes the recording unit 95 in the digital camera 90 to record the image data file (step S510).

In the above manner, the photography/recording controller 94 completes the series of processes from the establishment of the preset photography condition, to the execution of automatic photography, and to the recording of the image data file. Thereafter, the photography/recording controller 94 returns to the process from step S501, in preparation for the next automatic photography.

As described above, the photography/recording controller 94 executes the automatic photography on the basis of the series of processes illustrated in FIG. 9. The image data file obtained by this photography is sent to the smartphone 50, and is accumulated and recorded, as needed, in the recording unit 95.

The user of the digital camera 90 carries the smartphone 50, in which the application program dedicated to the digital camera 90 is installed, in close proximity to the digital camera 90. Thereby, the image data file is stored in an image data folder in the memory card, this image data folder being dedicated to the digital camera 90. Specifically, the image data file, which was sent from the digital camera 90, is stored in a predetermined data folder on the smartphone 50 side, for example, the image data folder which is dedicated to the digital camera 90 and is created in the memory card that is attached to the memory card slot 69.

Next, referring to FIG. 10, a description will be given of a process in which, in the smartphone 50, when album images are played back according to the application program dedicated to the digital camera 90, list images, which initially become an album top, are created and displayed on the display unit 56.

This application program is read out from the program memory 53 by the CPU 51, and developed and loaded in the work memory 52, and then the application program is executed. The process by this application program corresponds to a specific sub-routine of the process of step S301 in FIG. 5.

Figure 10:
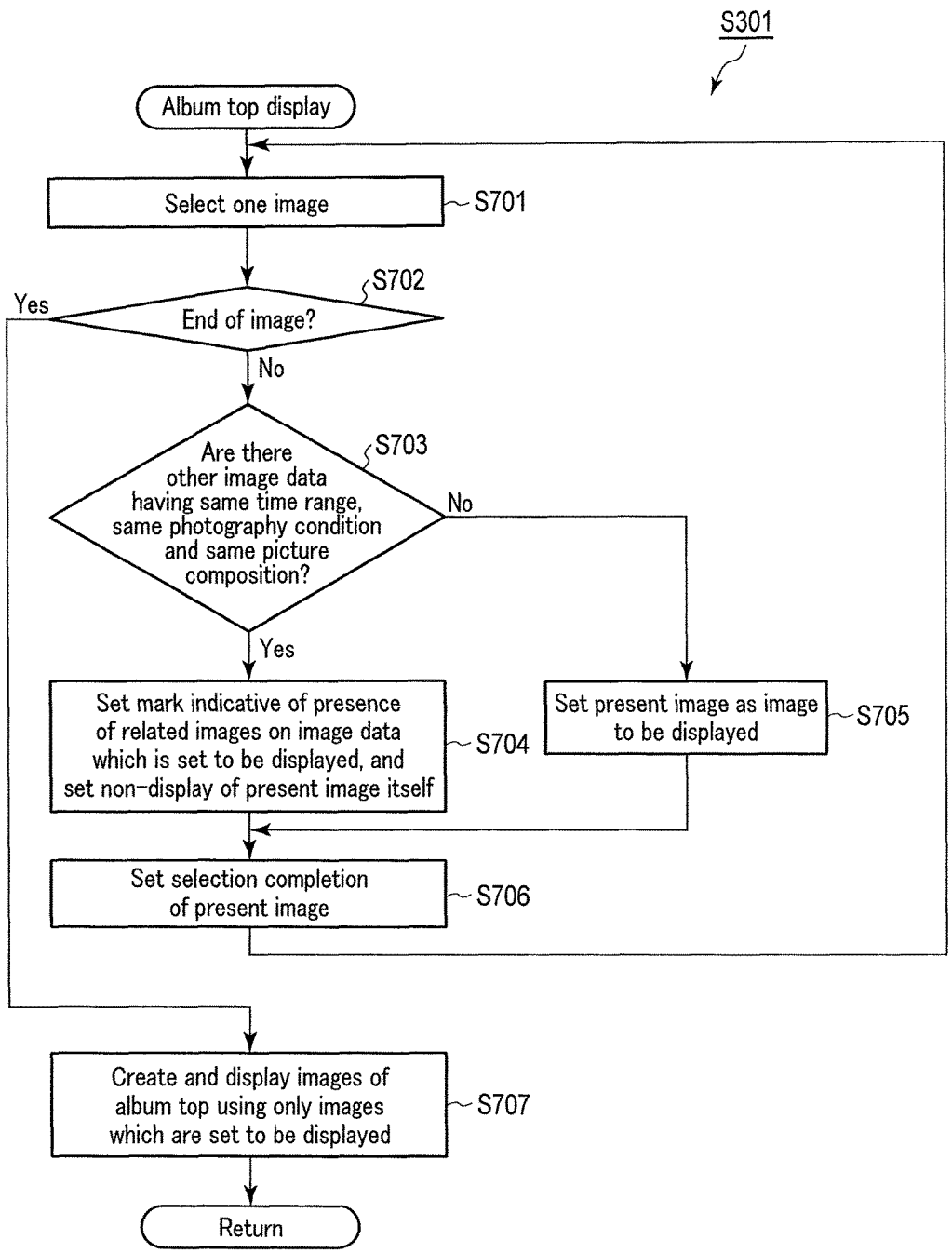
FIG. 10 is a flowchart illustrating content at a time of a display process of list images of an album top on a smartphone according to the second embodiment.

As illustrated in FIG. 10, at the initial time when the application program was started, the CPU 51 selects, from among the image file data stored in a predetermined image data folder of the memory card attached to the memory card slot 69, one image file data which has not been selected, in the order beginning with the latest photography date/time data (step S701).

The CPU 51 judges whether the selection of all image data is finished or not, based on whether there is image data which has not yet been selected by this selection (step S702).

If there is image data to be selected (No in step S702), the CPU 51 judges whether there are this selected image data and other image data (step S703). This other image data is image data which has already been set to be displayed as a part of the images of the album top, and which has the same time range, same photography condition and same picture composition as the selected image data.

If the CPU 51 judges that there is other image data which has already been set to be displayed, and has the same time range, same photography condition and same picture composition as the selected image data (Yes in step S703), this means that a similar image already exists among the images of the album top as the image to be displayed.

Thus, the CPU 51 sets additional information such that a symbol mark indicative of the presence of a related image is superimposedly displayed on a part of the image data which is already set to be displayed. In addition, the CPU 51 sets non-display of the immediately previously selected image data, and avoids display of overlapping images in the album top (step S704).

In addition, in the process of step S703, if the CPU 51 judges that there is no other image data which has already been set to be displayed, and has the same time range, same photography condition and same picture composition as the selected image data (No in step S703), this means that a similar images has not been set among the images of the album top as the image to be displayed.

Thus, the CPU 51 sets the immediately previously selected image data as the image data to be displayed (step S705).

After the process of step S704 or step S705, the CPU 51 sets selection completion with respect to the selected image data, the display/non-display setting of which is completed (step S706), and returns to the process from step S701 in preparation for other image data which has not been selected.

In this manner, the CPU 51 repeatedly executes the process of step S701 to S706, thereby setting display/non-display of all image data which are stored in the memory card attached to the memory card slot 69.

After the CPU 51 sets display/non-display and sets selection completion with respect to the last image data of the earliest photography date/time data, the CPU 51 executes the process of step S701. Then, in step S702, if the CPU 51 judges that there is no image data to be selected (Yes in step S702), the CPU 51 creates list images which become the album top as illustrated in FIG. 6, and causes the display unit 56 to display the list images (step S707) In this case, the CPU 51 creates list images which become the album top, by using thumbnail image data of the image data that were selected as image data to be displayed, and causes the display unit 56 to display the list images. By the above, the CPU 51 finishes the process of the sub-routine illustrated in FIG. 10, and goes to the process of step S302 illustrated in FIG. 5, in order to accept an operation on the album top images.

As has been described above in detail, in the present embodiment, the person wearing the sensor terminal 70 including the plural sensors is set as the subject, and the automatic photography is exactly executed by the digital camera 90 such that this subject falls within the photography view angle.

The image data acquired by the photography by the digital camera 90, the data of the sensor output which was the photography condition, and the data of the other sensor outputs are all transferred to the smartphone 50, and post-processes such as image playback are executed in the smartphone 50. Thus, the digital camera 90 can be dedicated to only the photography operation, and the load of processing can be reduced.

In addition, although not illustrated in the present embodiment, the digital camera 90 may transfer the captured image data and the data of various sensor outputs including the photography condition to the external smartphone 50 in the state in which these data are intentionally not made into data files. The smartphone 50, which received these data, executes a process of creating data files, such as creation of Exif data, and thereby the processing load on the digital camera 90 can be further reduced.

Furthermore, in the present embodiment, when automatic photography is executed, the person wearing the sensor terminal 70 is set as the subject, and image photography is executed by performing the zooming process corresponding to the position of this subject. Accordingly, automatic photography corresponding to a preset intention can be executed. For example, the subject can be set to be located over the entire photography view angle, or the subject can be intentionally set to appear smaller so as to correspond to any one of preselected picture compositions.

In the meantime, in the present embodiment, the case was described in which the sensor terminal 70 includes the GPS receiver 71 and GPS antenna 80. Thus, as one of the photography conditions, the point where the automatic photography is executed can be set in a pinpoint manner or within a range.

Thus, by presetting exact position information of a point where photography is to be executed, exact automatic photography can be executed.

Additionally, the number of times of automatic photography is limited to one, so as to avoid overlapping automatic photography at a time when it is judged from the above-described position information, that the subject is present within a predetermined range, and when some other photography condition is established. Thereby, it is possible to avoid useless automatic photography of similar images in the same area.

In the meantime, in the present embodiment, the case was described in which the various photography conditions are arbitrarily set based on the application preinstalled in the smartphone 50. However, the restriction to this is unnecessary. For example, a plurality of application programs may be prepared in accordance with the kinds of subjects that are photography targets (a person, a pet, etc.) and the environment and purposes of photography (e.g. mountain climbing, trekking, cycling, fishing, diving, golf, etc.). By selecting one of these application programs, the photography condition corresponding to the selected application program may be set in a substantially fixed manner.

Thereby, like the selection of photography by the scene program, the condition for automatic photography can efficiently be set by saving labor.

Besides, the present invention is not limited to the above-described embodiments. In practice, various modifications may be made without departing from the spirit of the invention. In addition, the embodiments may properly be combined and implemented, and, in such cases, the combined advantageous effects can be obtained. Furthermore, the embodiments include various inventions, and various inventions can be derived from combinations of structural elements selected from the disclosed structural elements. For example, even if some structural elements are omitted from all the structural elements disclosed in the embodiments, if the problem can be solved and the advantageous effects can be obtained, the structure, from which such structural elements are omitted, can be derived as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image playback apparatus comprising:
a display device; and
a CPU configured to execute processes comprising:
acquiring, in association with a plurality of sensing functions capable of being activated or inactivated, (i) photography image information that is automatically photographed under a predetermined photography condition based on a sensing result of the activated sensing function, together with (ii) trigger information indicative of the photography condition or the sensing function used for the photography condition; and
controlling the display device to display the trigger information acquired in the acquiring, in association with the photography image information;
wherein the photography image information acquired in the acquiring includes photography position information, and
wherein the CPU is configured to execute a further process of controlling the display device to display (i) a map and (ii) the trigger information acquired in the acquiring, by associating the trigger information with a corresponding position in the map.

2. The image playback apparatus of claim 1, wherein the trigger information indicative of the photography condition comprises at least one of a sign indicative of the sensing function used for the photography condition and a numerical value indicative of the photography condition.

3. The image playback apparatus of claim 1, wherein the controlling comprises controlling the display device to display a sign indicative of the sensing function used for the photography condition, a numerical value indicative of the photography condition, and a unit of the numerical value.

4. The image playback apparatus of claim 1, wherein the acquiring comprises wirelessly acquiring the photography image information and the trigger information from an imaging apparatus which is separate from the image playback apparatus.

5. The image playback apparatus of claim 1, wherein the acquiring comprises wirelessly acquiring, from an imaging apparatus which is separate from the image playback apparatus, position information of the imaging apparatus.

6. The image playback apparatus of claim 1, further comprising an input device configured to receive an instruction to change an image which is displayed on the display device,
wherein the controlling comprises controlling the display device to display an image based on the photography image information, in accordance with a change instruction received by the input device.

7. The image playback apparatus of claim 1, wherein the predetermined photography condition is determined by selection of at least one of the plurality of the sensing functions, and is transmittable to an imaging apparatus which is separate from the image playback apparatus.

8. The image playback apparatus of claim 1, wherein, when a plurality of the predetermined photography conditions are established within a predetermined time, the image acquisition device is configured to acquire at least one photography image information as a representative, and the controlling controls to display a plurality of pieces of the trigger information by associating the trigger information with the at least one representative photography image information.

9. An image playback method executed by a CPU of an image playback apparatus comprising a display device, the method comprising:
   acquiring, in association with a plurality of sensing functions capable of being activated or inactivated, (i) photography image information that is automatically photographed under a predetermined photography condition based on a sensing result of the activated sensing function, together with (ii) trigger information indicative of the photography condition or the sensing function used for the photography condition; and
   controlling the display device to display the trigger information acquired in the acquiring, in association with the photography image information,
   wherein the photography image information acquired in the acquiring includes photography position information, and
   wherein the method further comprises controlling the display device to display (i) a map and (ii) the trigger information acquired in the acquiring, by associating the trigger information with a corresponding position in the map.

10. A non-transitory computer-readable recording medium having a program stored thereon, the program being executable by a CPU of an image playback apparatus to control the CPU to execute processes comprising:
   acquiring, in association with a plurality of sensing functions capable of being activated or inactivated, (i) photography image information that is automatically photographed under a predetermined photography condition based on a sensing result of the activated sensing function, together with (ii) trigger information indicative of the photography condition or the sensing function used for the photography condition; and
   controlling the display device to display the trigger information acquired in the acquiring, in association with the photography image information,
   wherein the photography image information acquired in the acquiring includes photography position information, and
   wherein the CPU, under control of the program, executes a further process of controlling the display device to display (i) a map and (ii) the trigger information acquired in the acquiring, by associating the trigger information with a corresponding position in the map.

11. An image playback apparatus comprising:
a display device; and
a CPU configured to execute processes comprising:
   acquiring, in association with a plurality of sensing functions, (i) photography image information that is automatically photographed under a predetermined photography condition, together with (ii) trigger information indicative of the photography condition or the sensing function used for the photography condition; and
   controlling the display device to display the trigger information acquired in the acquiring, in association with the photography image information,
   wherein the photography image information acquired in the acquiring includes photography position information, and
   wherein the CPU is configured to execute a further process of controlling the display device to display (i) a map and (ii) the trigger information acquired in the acquiring, by associating the trigger information with a corresponding position in the map.

* * * * *